July 27, 1965  J. R. MORDAN  3,196,726
MOBILE APPARATUS FOR CUTTING DISCARDED AUTOMOBILE
BODIES INTO PIECES OF SCRAP STEEL
Filed Sept. 20, 1963  5 Sheets-Sheet 1
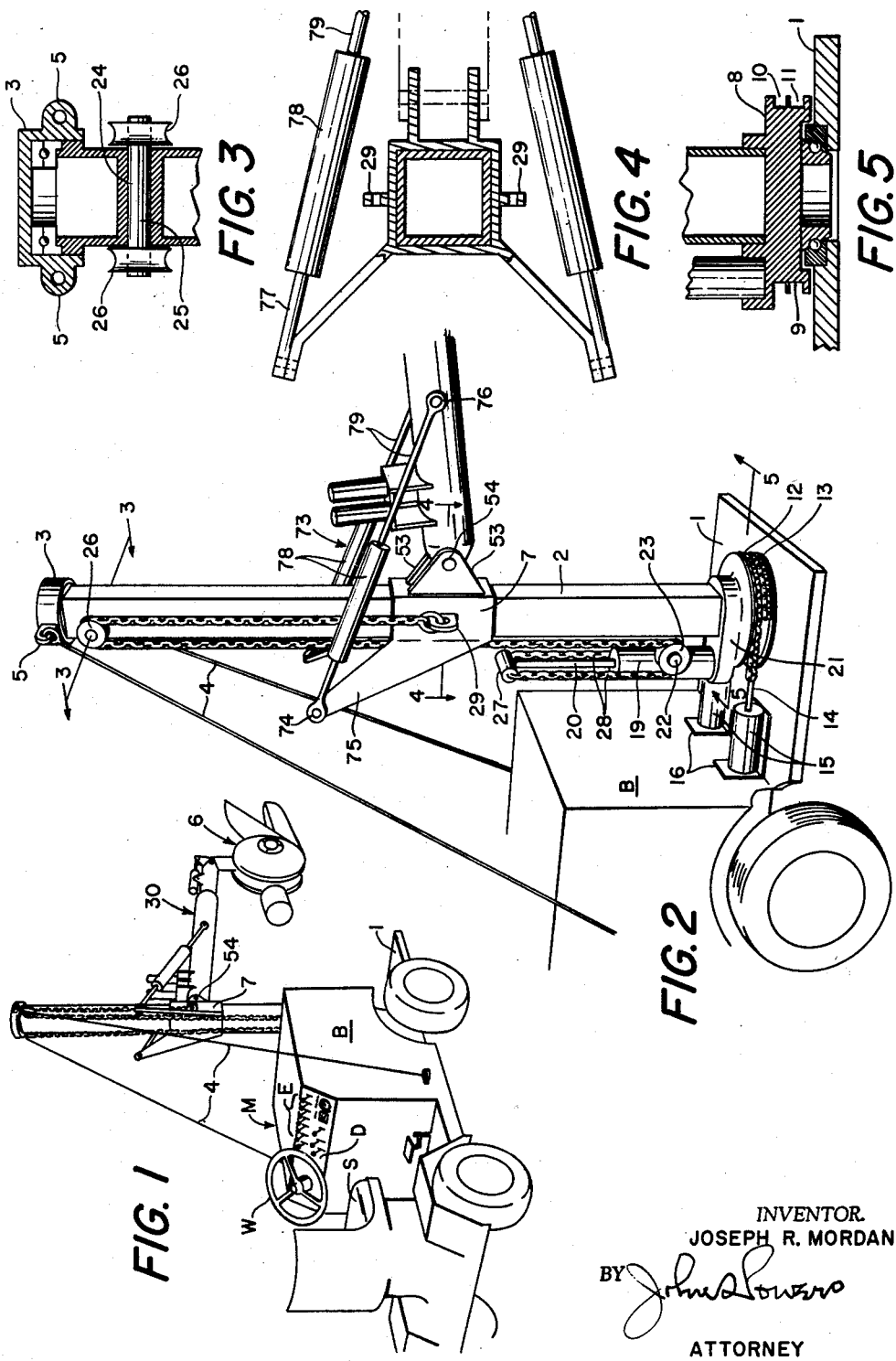
INVENTOR.
JOSEPH R. MORDAN
BY
ATTORNEY

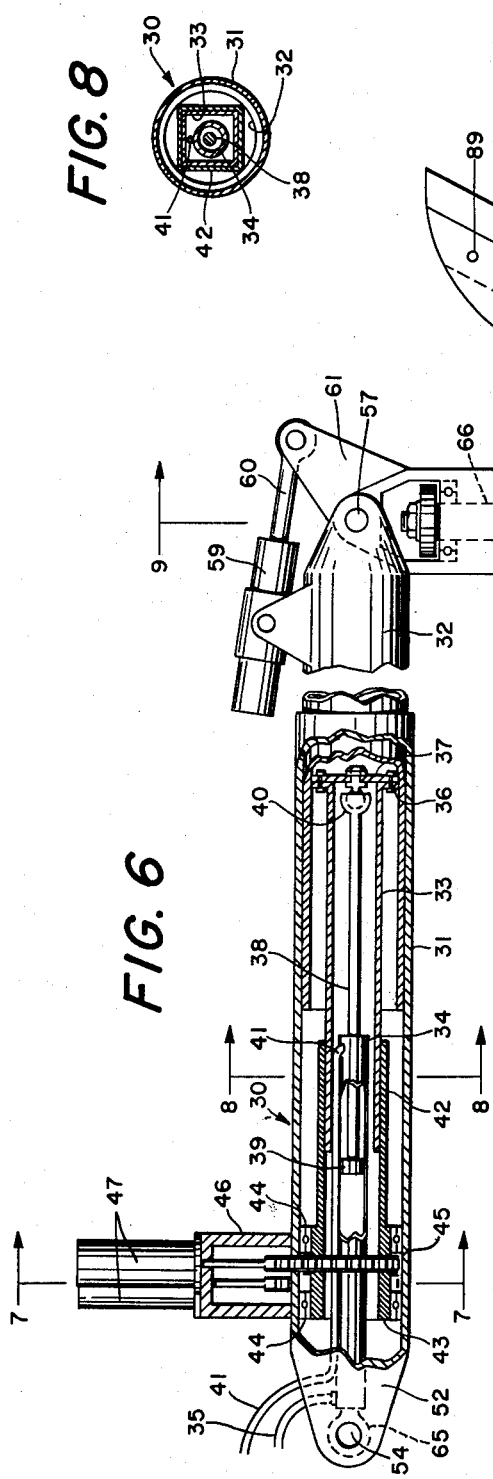

July 27, 1965 J. R. MORDAN 3,196,726
MOBILE APPARATUS FOR CUTTING DISCARDED AUTOMOBILE
BODIES INTO PIECES OF SCRAP STEEL
Filed Sept. 20, 1963 5 Sheets-Sheet 3
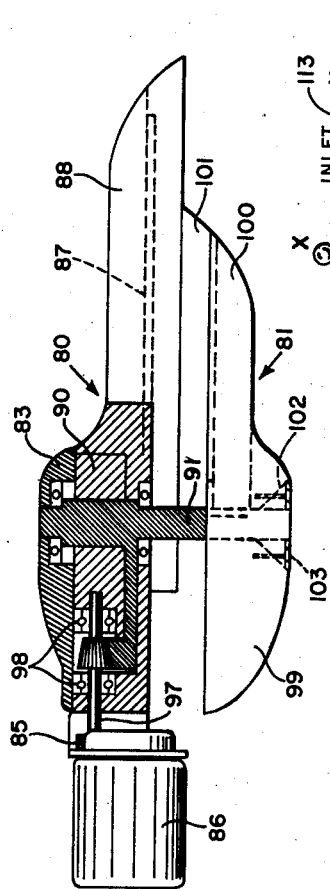
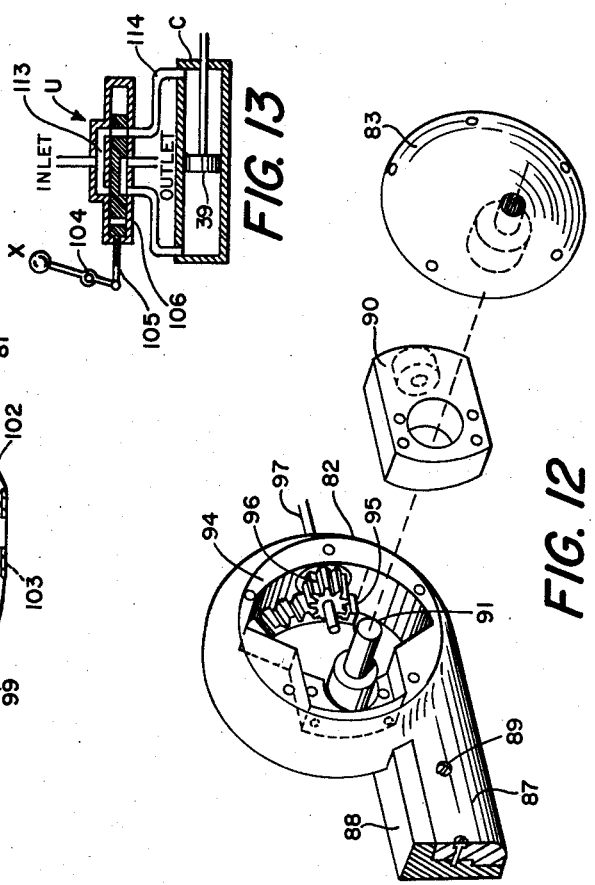
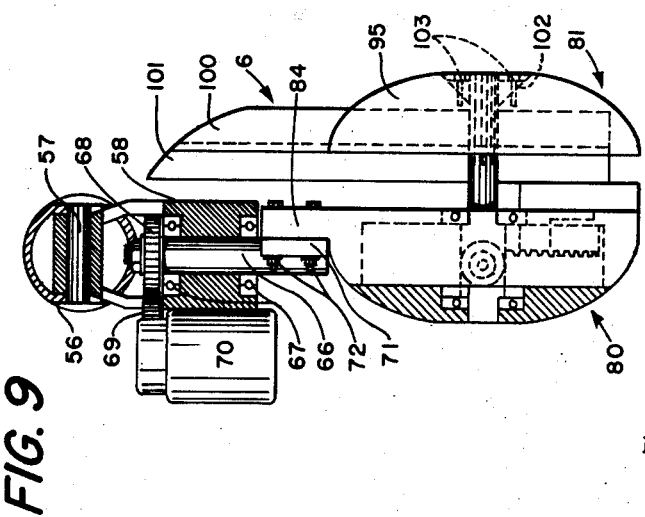
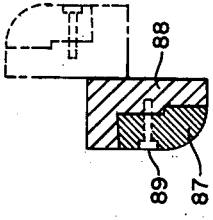
INVENTOR.
JOSEPH R. MORDAN
BY
ATTORNEY

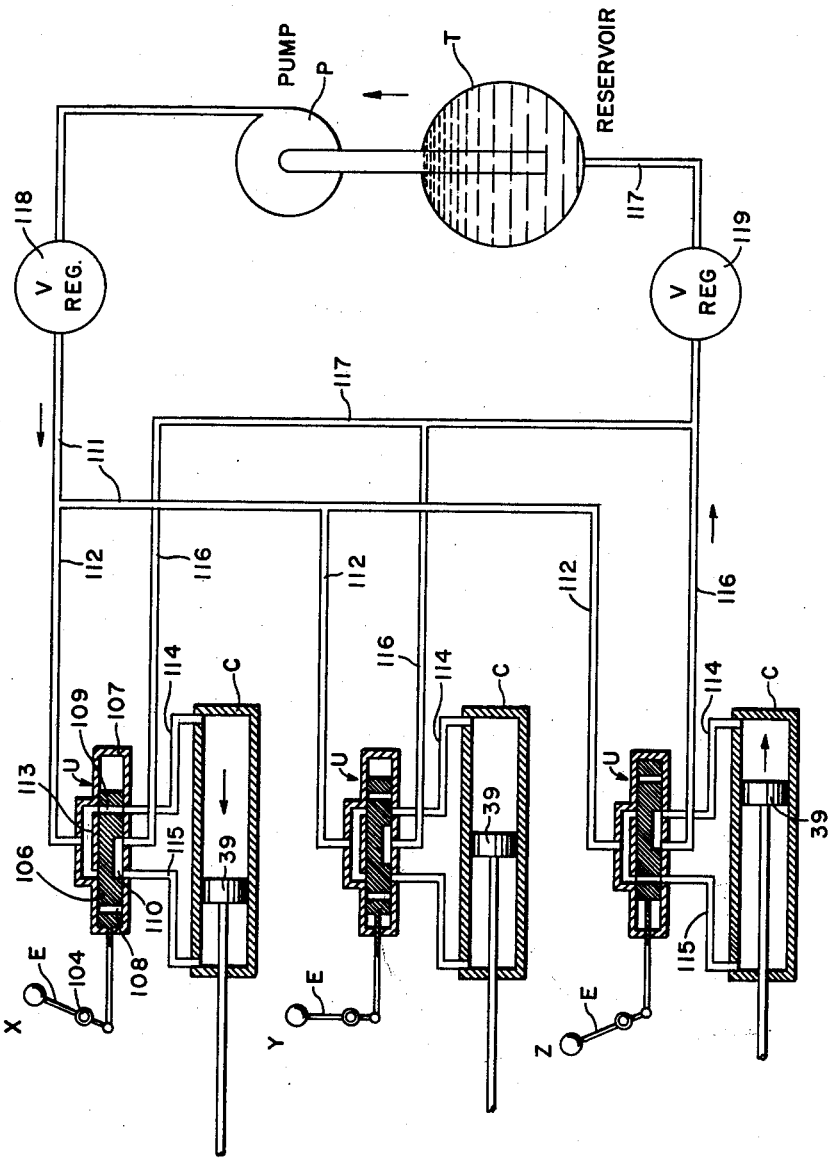

July 27, 1965    J. R. MORDAN    3,196,726
MOBILE APPARATUS FOR CUTTING DISCARDED AUTOMOBILE
BODIES INTO PIECES OF SCRAP STEEL
Filed Sept. 20, 1963    5 Sheets-Sheet 5

INVENTOR.
JOSEPH R. MORDAN
BY John Powers.
ATTORNEY

United States Patent Office 3,196,726
Patented July 27, 1965

3,196,726
MOBILE APPARATUS FOR CUTTING DISCARDED AUTOMOBILE BODIES INTO PIECES OF SCRAP STEEL
Joseph R. Mordan, 13260 Clinton St., Alden, N.Y.
Filed Sept. 20, 1963, Ser. No. 310,216
10 Claims. (Cl. 83—523)

The sheet metal parts of automobiles which are unfit for further use are usually deposited in "automobile graveyards," that is to say areas selected for the purpose by municipal or county authorities, where they are reduced to relatively small pieces of scrap steel for use in foundry operations. One practice largely followed has been for a relatively large crew of workmen, severally provided with acetylene torches, to cut the automobile bodies into scrap steel pieces of suitable size. This work is slow, i.e., time consuming in a high degree, and is also highly expensive from a labor standpoint.

My invention consists of a mobile apparatus for cutting discarded automobile bodies into the required scrap steel pieces.

The principal object is to enable the work to be performed with a substantial saving of expense by greatly cutting down the time required for the operation, thereby substantially increasing the number of discarded automobile bodies which may be reduced to scrap in a unit of time, and by eliminating the necessity for a large crew of workmen, the apparatus being under the control of a single operator.

A further object is to provide apparatus in which a power driven steerable mobile unit movable forward and rearward supports a forwardly located metal shearing cutter and sundry forwardly located elements available for the positional adjustment of the cutter within ranges of vertical movement, fore and aft movement, pivotal movement in a vertical plane within a wide angular horizontal range, pivotal movement in any horizontal plane within its range of vertical movement and pivotal movement about a central axis whereby the blades will have their shearing action at any angle that may be desired, and in which the operator, occupying the driver's seat of the mobile unit, conveniently and immediately controls the several positional adjustments of the cutter. By virtue of these characteristics the cutter is, in effect, supported for universal positional adjustment and thereby, the optimum positioning of the mobile unit being assumed, the operative positioning of the cutter is effected quickly and accurately and the repositioning of the cutter for a succeeding operation is effected rapidly and with equal accuracy and facility.

A further object is to provide apparatus in which the several positional adjustments of the cutter are effected by devices operated by power from a source carried by the mobile unit and the operator in controlling the several positional adjustments of the cutter readily and immediately effects the release of power from the source to the particular device to be operated.

A further object is to provide apparatus in which the cutter is in the form of a pair of shears, one blade of which is power driven and pivotally movable relatively to the other blade, the shear blades having a length of the order of twenty-two inches whereby they are available for cutting scrap metal pieces of any desired size between maximum and minimum as determined by foundry operations, the shear construction having great strength and facility of operation.

A further object is to provide apparatus in which the operating parts as a whole are of relatively light weight as compared with the mobile unit and in which, with these parts arranged in forward positions, the mobile unit will remain stable in any position desired throughout the period of the cutting operation and may be readily and quickly repositioned for a succeeding cutting operation.

A further object is to provide apparatus which requires a minimum crew of men for its use. Thus the only workmen required, in addition to the operator, are one or two who may be needed to push an automobile body from an elevated position to a lower position and to gather the pieces that are cut from the body. For this work not more than two men are needed whereas for the accomplishment of the same work in the same time by the use of acetylene torches a crew of the order of fifteen men (cutters and others who position the automobile bodies) are usually required. Thus my apparatus in a single hour will produce fifteen man-hours of work as required heretofore at an expenditure of not more than three man-hours of work.

In the drawings:

FIGURE 1 is a perspective view showing schematically the mobile unit with the cutter and the operating elements associated with the cutter located forwardly of the mobile unit.

FIGURE 2 is a perspective view of a vertical mast, preferably of rectangular section, which is supported on a platform projecting from the front of the mobile unit and is positionally adjustable about a central vertical axis, this figure also showing certain elements which are positionally adjustable vertically along the mast.

FIGURE 3 is a fragmentary vertical sectional view in the plane 3—3 of FIGURE 2.

FIGURE 4 is a horizontal sectional view on the line 4—4 of FIGURE 2.

FIGURE 5 is a fragmentary vertical sectional view in the plane 5—5 of FIGURE 2.

FIGURE 6 is a view partly in longitudinal section and partly in side elevation showing the cutter and one of its supporting arms, features shown in section being associated with the supporting arm.

FIGURE 7 is a vertical sectional view in the plane 7—7 of FIGURE 6.

FIGURE 8 is a vertical sectional view in the plane 8—8 of FIGURE 7.

FIGURE 9 is a view of the cutter partly in front elevation and partly in vertical section on the line 9—9 of FIGURE 6.

FIGURE 10 is a view of the cutter, partly in top plan and partly in horizontal section on the line 10—10 of FIGURE 9.

FIGURE 11 is a vertical sectional view on the line 11—11 of FIGURE 6.

FIGURE 12 is an exploded perspective view of the movable blade of the cutter and of sundry elements for effecting its movement, the cutter blade being shown in vertical section.

FIGURE 13 is a longitudinal sectional view, with parts in elevation, showing details of sundry elements in association as an operative unit (one of a series), namely a manual control element, a piston movable in either direction by hydraulic fluid, a cylinder for the piston and a valve directly operated by the manual control element for selecting a particular path of flow of the hydraulic fluid.

FIGURE 14 is a diagrammatic view showing an aggroupment of three of the units, as individually shown in FIGURE 13, in their three phases of operation and in association with the reservoir for the hydraulic fluid, a pump for effecting the flow of the hydraulic fluid and the lines of tubing through which the hydraulic fluid flows in its movement to actuate the units and its return movement to the reservoir.

Figure 15:
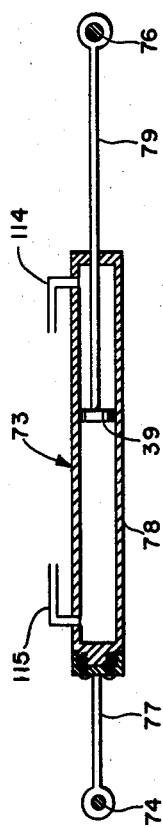

FIGURE 15 is a transverse sectional view showing the connection of certain parts of an extensible and retractable linkage member.

Figure 16:
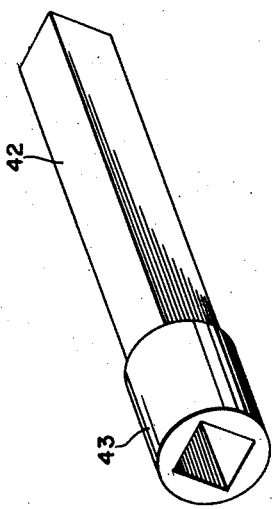

FIGURE 16 is a detail perspective view of a ring and an integrally connected extension of rectangular cross section which is a part of the assembly of the supporting arm of the cutter.

Figure 17:
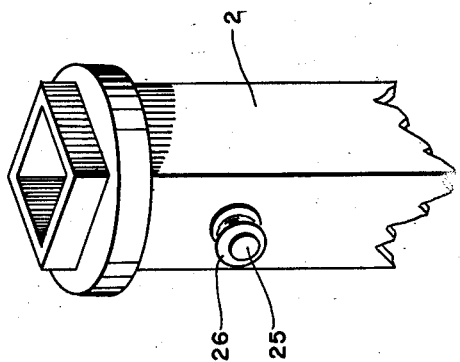

FIGURE 17 is a detail fragmentary perspective view of the upper end of a vertical mast as an element for the support of the cutter.

In FIGURE 1 the mobile unit is indicated generally at M and is essentially an automobile having a driver's seat S, a steering wheel W, a dashboard D, a body B in which the motor is enclosed, and the usual provision for forward and rearward movement.

A forwardly projecting shelf 1 is carried by the body B at an elevation above ground level of the order of sixteen inches and provides support for a vertical mast 2, preferably of rectangular section and having at its upper end a cap 3, the mast being approximately nine feet in height and being braced by guy wires 4 connected to lugs 5 on the cap and to the body B. The cutter, generally designated as 6, is located forwardly of the mast and has its support from the mast by sundry elements which will be pointed out in detail as the description proceeds and by means of which the cutter may be brought into any desired position relatively to the discarded automobile body from which the pieces are to be cut.

The operations of the elements for the support and positioning of the cutter are controlled by the driver of the unit M by means of a series of manually operated control elements E, shown schematically in FIGURE 1 as mounted on the dashboard D. Some of the elements for the positioning of the cutter are operated by hydraulic motors and others by hydraulically movable pistons. It is deemed unnecessary to illustrate the flow circuits for the motors and the pistons, such circuits being items of common knowledge. The tank for the hydraulic fluid and the pump for effecting its flow are, of course, located within the body B.

For raising and lowering the cutter 6 a vertically movable sleeve 7 is mounted on the mast 2, the sleeve preferably being of rectangular cross section in conformity with the cross section of the mast whereby in functional effect it is slidably keyed to the mast. The sleeve has a range of vertical positional adjustment movement of approximately six feet.

For effecting the movement of the cutter in a horizontal plane the mast 2 is mounted for turning movement about its vertical axis and has a conformable fit in a recess of a supporting base 8 (FIGURE 5) which is connected to the inner ring of a ball bearing 9 fitted in a recess in the shelf 1. The base 8 includes a portion of annular outline which is formed as a sheave, having upper and lower peripheral channels 10 and 11 to accommodate chains, or equivalent flexible parts, 12 and 13 respectively, the upper chain 12 extending counterclockwise in the channel 10 with its outer end fixed to the base 8 and the lower chain 13 extending clockwise in the channel 11 with its outer end similarly fixed. The elements of the construction which are operated by hydraulic pistons are sufficiently indicated by the showing of their cylinders, details of one such piston, later to be described, being shown in FIGURE 6. The chains 12 and 13 are connected at their inner ends to the projecting rods 14 of the pistons which are movable in horizontal cylinders 15 attached to brackets 16 connected to the front wall of the body B near its lower end. At its upper end the mast 2 is formed with an annular projection 17 which fits conformably and rotatably within the cap 3 and is connected to the lower ring of a ball bearing 18 arranged within the cap. The inward pulling movements of the chains 12 and 13 respectively effect clockwise and counterclockwise turning movements of the mast 2, each chain having a compensating outward movement when the companion chain is moved inward and the pistons being under the control of a single element E.

The sleeve 7 may be raised and lowered upon the mast 2 by any suitable power operated means. As shown, such means utilizes a hydraulic piston movable vertically in a cylinder 19, the piston having an upwardly projecting rod 20, the cylinder 19 being mounted at the rear side of the mast 2 upon a bracket 21 located above and connected to the base 8, and the rod 20 being connected by a chain and pulley system to the sleeve 7. When the sleeve 7 is fully lowered it rests upon the bracket 21. As shown, the sleeve is in a position intermediate the limits of its movement. The cylinder 19 carries an externally located bearing for a horizontal shaft 22 having projecting ends upon which pulleys 23 are mounted. The mast 2 is provided near its upper end with an internally located bearing 24 for a horizontal shaft 25 having projecting ends upon which pulleys 26 are mounted adjacent the side walls of the mast 2. The piston rod 20 is provided at its upper end with a cross bar 27 to which chains 28 or equivalent flexible parts are connected. The chains 28 extend downward from the cross bar 27 and are trained over the pulleys 23 from which they extend upward and over the pulleys 26 and then downward to the sleeve 7, with their outer ends connected to lugs 29 provided upon the sleeve 7. When the hydraulic piston is moved upward or downward the sleeve 7 is moved upward or downward on the mast 2 to a corresponding degree with resultant raising or lowering of the elevation at which the cutter is supported.

One of the elements for the support of the cutter 6 by the sleeve 7 is shown in detail in FIGURE 6 and is an arm 30 which includes telescopically related body members 31 and 32 of cylindrical cross section, the member 32 fitting within the member 31 from which it projects forwardly and being in functional effect a part of the rod of a hydraulic piston enclosed within the member 31. At its inner end the member 32 is provided with an axially directed extension 33 of rectangular section which encloses a cylinder 34 closed at its ends and to the inner end of which (the end at the left, FIGURE 6 being considered) hydraulic fluid is admitted through a section of tubing 35. The extension 33 is provided with an annular circumscribing flange 36 which enables its attachment to the inner end of the member 32, a plate 37 of disc outline being held in clamped relation between the flange 36 and the adjacent end of the member 32. The piston rod of which the member 32 forms a part is completed by a rod section 38 located coaxially within the extension 33 and projecting into the cylinder 34 within which it is provided with a piston head 39. The rod section 38 is terminally connected by a coupling element 40 to the plate 37, the element 40 including a part in the form of a ball joint whereby the member 32 may have turning movement about its longitudinal axis. Hydraulic fluid admitted into the cylinder 34 through the tubing 35 acts upon the piston 39 to effect its outward movement with resultant outward movement of the member 32. The inward movement of the piston 39 with resultant inward movement of the member 32 is effected by hydraulic fluid admitted through a section of tubing 41 and reacting against the opposite side of the piston 39 and the inner end of the cylinder 34, the hydraulic pressure introduced through the tubing 35 of course being opposed by the hydraulic pressure introduced through the tubing 41. When the member 32 is to be moved inward the pressure of the fluid from the tubing 35 is backed off to a point where the opposing pressure of the fluid from the tubing 41 will move the piston 39 inward, the backing off of the hydraulic pressure being continued until the member 32 has been brought to a desired position at which time the hydraulic pressure from the tubing 35 is increased until it balances the pressure exerted by the pressure from the tubing 41, the member 32 of course remaining in the position into which it has been moved.

The extension 33 has a slideable fit within a sleeve 42 of rectangular cross section which extends outwardly from a ring 43 utilized in effecting the turning movement of the body member 32 about its longitudinal axis. The ring 43 is coaxial with the sleeve 42 and is mounted for turning movement about its longitudinal axis. The mounting of the ring is provided by a pair of ball bearings 44 in spaced relation to delimit an annular channel 45, the inner rings of the ball bearings 44 being secured to the ring 43 and the outer rings being secured to the member 31. An upright bracket 46 is mounted upon the member 31 and provides support for a pair of cylinders 47 which enclose hydraulically movable pistons under the control of a single element E having downwardly projecting rods 48. Chains 49 and 50 or equivalent flexible parts are connected to the respective rods 48 and extend into the channel 45 through openings 51 in the member 31. The chains 49 and 50 are attached at their ends to the ring 43, the chain 49 extending counterclockwise in the channel 45 and the chain 50 extending clockwise. The cutter, later to be described in detail, includes a pivotally movable shearing element and is pendent from the outer end of the member 32. This member is turned in either direction about its longitudinal axis (having an arc of movement of 180 degrees and being assumed in the drawing as in its median position) by means of the chains 49 and 50 as moved by the pistons within the cylinders 47, the upward pulling movement of the chain 49 effecting a clockwise turning movement of the member 32 and the upward pulling movement of the chain 50 effecting a counterclockwise turning movement of the member 32. When the ring 43 is turned in either direction its movement is transmitted to the member 32 by the sleeve 42 of rectangular cross section and the extension 33 of the member 32 as fitting conformably and slideably in the sleeve 42. The turning movement of the member 32 varies the angularity at either side of the perpendicular of the plane of movement of the movable shearing element of the cutter 6, enabling the cutter to be presented at an optimum angle to the part to be cut.

For the support of the element 30 from the sleeve 7 the body member 31 has at its inner end projections 52 which are connected to forwardly projecting lugs 53 on the sleeve 7 by a pivot pin 54. The cylinder 34 carries at its inner end a projecting ring 55 for the accommodation of the pin 54, the ring 55 anchoring the cylinder 34 to the pin 54. The body member 32 is provided at its outer end with projections 56 which accommodate a pivot pin 57 for the bracket 58 (FIGURE 9) which carries the cutter 6, the bracket having a range of forward and return movement of ninety degrees about the pivot 57 from the position in which it is shown in FIGURE 6 in order to vary the angle at which it extends from the member 32.

By virtue of the features described the arm 30 is extensible and retractable. When the arm 30 is fully extended it has a length of about nine and one-half feet and when fully retracted has a length of about seven feet. In its lowest position, in which the sleeve 7 rests upon the bracket 21 and the arm 30 projects substantially horizontally from the sleeve 7, the elevation of the arm 30 above the ground is about four feet. The length of the bracket 58 is about fourteen inches and the circular parts of the cutter (to be later described) have a diameter of about twenty-six inches.

The member 32 carries the means for effecting the pivotal movement of the bracket 58. This means includes a hydraulically movable piston mounted in a cylinder 59 and having a forwardly projecting rod 60. The bracket 58 is formed with projecting lugs 61 to which the rod 60 is secured by a pivot pin 62. The cylinder 59 is secured in a mounting sleeve 63, which is pivoted as at 64 to lugs 65 provided on the member 32. When the piston within the cylinder 59 is in its advanced position under hydraulic pressure the bracket 58 will extend at a substantial right angle from the body member 32 and when the piston under reverse pressure is in any retracted position the bracket 58 will be moved forwardly to a corresponding degree about pivot 57 and will extend from the member 32 at a corresponding obtuse angle.

The cutter 6 has rotatable positional adjustment about the axis of the bracket 58 and is shown in a median position. For such adjustment a vertical shaft 66 is mounted in the bracket 58 and is rotatable through an arc of 180 degrees within ball bearings 67 fitted in recesses in the upper and lower faces of the bracket. The shaft 66 carries a spur gear 68 at its upper end which is in mesh with a driving spur gear 69 operated by a reversible hydraulic motor 70 mounted on the bracket 58. The shaft 66 extends below the bracket 58 and carries lateral projections 71 (FIGURES 6 and 9) which are attached by fastenings 72 to the stationary shear element of the cutter 6.

The support of the cutter 6 by the sleeve 7 is completed by a pair of linkage members designated generally as 73 which are simultaneously extensible and retractable. The members 73 are pivotally connected at their inner ends as at 74 to rearwardly directed bracket extensions 75 provided on the sleeve 7 and at their outer ends are pivotally connected as at 76 to the body member 31 of the element 30. Each linkage member 73 comprises an inner bar section 77 of fixed length which extends from the pivot 74, a coaxial hydraulic cylinder 78 having its closed end attached in fixed relation to the end of the section 77 (FIGURE 15) and an outer bar section 79 constituted by the projecting part of the rod of the piston movable in the cylinder 78, the section 79 being connected to the pivot 76. When the pistons are moved by hydraulic pressure to their outward limit the members 73 will be fully extended, as shown in FIGURE 2, and the element 30 will be supported in a substantially horizontal position. When the pistons are retracted the bar sections 79 are moved inward and the members 73, of course, will be shortened, thereby to raise the element 30 about its pivot 54 to any desired elevation. The linkage members 73 when fully extended to hold the arm 30 in a substantially horizontal position have a length of about three and one-half feet and when fully retracted to raise the arm 30 to its limit about its pivot 54 have a length of about twenty-one inches.

The cutter 6 includes stationary and pivotally movable shear elements 80 and 81 respectively.

The stationary shear element 80 provides an enclosing casing which includes a chambered member 82 and an attached cap member 83. The member 82 is provided with an upwardly directed lug 84 to which the shaft extensions 71 are connected; also with a rearwardly projecting bracket 85 for the support of a reversible hydraulic motor 86 (shown schematically) by which, through suitable gearing, the shear element 81 is moved in either direction; and also with a forwardly projecting arm 87 to which a shear blade 88 is attached by fastenings 89, the blade 88 being disconnectable from the arm 87 when its sharpening may be required. The member 82 encloses a bearing block 90 for a transverse shaft 91 by which the movable shear element 81 is operated, the block 90 being attached to the cap member 83. The shaft 91 is movable in ball bearings 92 fitted in openings in the chambered member 82 and the cap member 83, the shaft 91 of course projecting to a suitable extent beyond the chambered member 82. The shaft 91 carries a crown gear segment 93 which extends between the bearing block 90 and the wall of the chamber provided by the member 82, the segment 93 being provided beyond the bearing block 90 with teeth 94 having end stops 95 by which the movement of the crown gear in either direction is limited. The teeth 94 are engaged by a bevel gear 96 mounted on a longitudinal shaft 97 which operates within ball bearings 98 and has a journaled mounting in the block 90 and a peripheral wall of the member 82, the shaft 97 being operated by the hydraulic motor 86 and connected by suitable gearing (unnecessary to illustrate) to the motor shaft.

The movable shear element 81 has a hub part 99 in opposed relation to the chambered member 82, the hub part being provided with a forwardly projecting arm 100 similar to the arm 87 which carries a detachably connected shear blade 101 similar to the shear blade 88. The hub part 99 has a keyed mounting upon the projecting part of the shaft 91 and is positioned whereby the shear blades 88 and 101 are in adjoining relation. The hub part 99 is held in such position by an annular series of wedging pieces 102 fitted in a recess in the hub part to which it is attached by fastenings 103, the wedging pieces surrounding the shaft 91 and bearing with frictional pressure upon the hub part and the shaft such that the movable shear element 81 is securely held against axial displacement on the shaft.

From the foregoing description it will be noted that the cutter 6 may readily be placed in the optimum position for the particular cut to be made. Thus, it may be elevated or lowered as desired by the movement of the sleeve 7 along the mast 2; it may be brought to any desired position in a horizontal plane by effecting the turning movement of the mast 2 about its longitudinal axis; with the bracket 58 functioning as a radius arm it may be brought to any position desired with reference to the longitudinal axis of the arm 30 as a center; from any position to which it may be brought by the sleeve 7 and the mast 2 it may be moved forward or backward by a selection of the effective length of the arm 30; from any position to which it may be brought by the sleeve 7 and the mast 2 it may be moved vertically and angularly about the pivot 54; it may be set relatively to the arm 30 at any desired angle in a vertical plane by effecting its movement about the pivot 57; and it may be set relatively to the arm 30 at any desired position in a horizontal plane by effecting its movement by the shaft 66 about the axial center of the bracket 58. The various movements required to bring the cutter 6 to its optimum position are quickly effected by the operator by the selection of the appropriate element E and the actuation of these elements in an appropriate sequence.

Each manual control element E is shown as a finger piece having an intermediate pivotal mounting 104 on the dashboard D and movable to any of three positions (FIGURE 14) designated as X, Y and Z respectively. Each finger piece is a part of an operating unit, one of which, generally designated as U, is shown in detail in FIGURE 13. In position X the piston 39 is moved to the left (FIGURES 13 and 14 being considered); in position Y the unit is inoperative, that is to say not conditioned for operation; and in position Z the piston 39 is moved to the right. The finger piece E is connected at its lower end by a link 105 to a plate valve 106 which is slideably movable in a casing 107. The valve 106 is formed with ducts 108 and 109 which extend between its opposite flat faces and in its lower flat face with an intermediate recess 110 which also functions as a duct. In FIGURES 13 and 14 the cylinder in which the piston 39 is movable is indicated at C and may be taken as any of the hydraulic cylinders referred to in the preceding description, namely the cylinders 15, 19, 34, 47, 59 and 78.

The hydraulic fluid is maintained in a tank T from which it is drawn and to which it is returned by a pump P.

The hydraulic fluid flows from the pump P through a line of piping 111 in the nature of a manifold having branches 112 severally leading to the units U and communicating with inlet chambers 113 formed in a wall of each casing 107. When the plate valve 106 is positioned with its duct 109 in registry with the inlet chamber 113, the corresponding element E being in position X, the hydraulic fluid flows through a line of tubing 114 to the right end of the cylinder C (FIGURES 13 and 14 being considered) and the piston 39 is moved by fluid to the left. During such movement of the piston 39 the fluid at the left of the piston is discharged through a line of tubing 115 into and through the recess 110 of the valve 106 whence it issues through a line of tubing 116 which is a branch of a return manifold 117 by which the hydraulic fluid is conveyed back to the tank T. In like manner, when the plate valve 106 is positioned with its duct 108 in registry with the inlet chamber 113, the corresponding element E being in position Z, the hydraulic fluid flows through one of the lines of tubing 115 to the left end of the cylinder C and the piston 39 is moved by the hydraulic fluid to the right. During such movement of the piston 39 the fluid at the right of the piston is discharged through one of the lines of tubing 114 into and through the recess 110 of the valve 106 whence it issues through another branch 116 to the return manifold 117. When the finger piece E is in its position Y neither of the ducts 108 and 109 is in communication with a line of tubing and the piston 39 of the corresponding cylinder C, as shown in FIGURE 14, remains idle in an intermediate position. The manifold 111 is preferably provided with a check valve 118 which prevents any return flow of the hydraulic fluid to the pump P and the manifold 117 is preferably provided with a check valve 119 which prevents any return flow of the fluid through any of the branches 116.

In the case of the two cylinders from which the rods 14 project and which are under the control of a single element E, the features (ducts) of the plate valve 106 are duplicated and the lines of tubing by which the plate valve casing 107 is connected to the cylinders 15 are, of course, arranged to deliver the hydraulic fluid simultaneously to opposite ends of the cylinders and simultaneously to return the hydraulic fluid from the other opposite ends of the cylinders. It is believed that the details of the connections will be sufficiently clear from the foregoing description and that further illustration is unnecessary. A similar arrangement is also used for the cylinders 47 and the pistons which they enclose.

To simplify the illustration the hydraulic motors 70 and 86 have not been included in the diagram of FIGURE 14. It will be understood, however, that they are similarly controlled by corresponding elements E through corresponding plate valves 106 and are similarly connected to the supply and return manifolds 111 and 117.

It will also be understood that as mounted on the dash D the elements E will severally be in association with markings indicative of the particular operations which they control, the illustration of such markings being deemed unnecessary.

I claim:

1. An apparatus for cutting discarded automobile bodies into pieces of scrap steel comprising, in combination: a wheeled mobile unit having a forwardly projecting shelf, an upright mast mounted upon the shelf for turning movement about its vertical axis, a sleeve mounted on the mast for vertical movement and for participation in its turning movement, an arm pivotally connected at its rear end to the sleeve for support, projecting forwardly from the sleeve and movable about its pivot in a vertical plane, an extensible and retractable linkage member for the support of the arm and having its rear end pivotally connected to the sleeve and its front end pivotally connected to the arm, a bracket pivotally pendent from the front end of the arm, a cutter carried by the bracket and consisting of pivotally connected companion shear parts operative by their relative pivotal movements to carry out the cutting operation, a series of power operated movable elements severally for effecting the turning movement of the mast in either direction, the vertical movement of the sleeve in either direction, the extensible and retractable movements of the linkage member with resultant vertical movement in either direction of the arm, the pivotal movement in either direction of the bracket from and to a position in which it is normal to the arm, and the relative pivotal movements of the shear parts, a series of controlling elements carried by the mobile unit and operable selectively by the driver of the mobile unit, and means severally responsive to the particular operations of the controlling elements for severally effecting the operations of the power operated elements.

2. An apparatus as set forth in claim 1 wherein the arm is composed of telescopically related inner and outer body members, the inner member being pivotally connected to the sleeve and the outer member carrying the pivotally pendent bracket, and the series of power operated elements includes an element mounted within the arm and having an axially movable part connected to the outer member whereby the arm is extensible and retractable.

3. An apparatus as set forth in claim 1 wherein a shaft is mounted coaxially in the bracket and is attached to one of the shear parts and the series of power operated elements includes an element for effecting the turning movement of the shaft.

4. An apparatus as set forth in claim 2 wherein the outer member of the arm is mounted for turning movement about its longitudinal axis and the series of power operated elements includes elements for effecting the turning movement in either direction of the outer member of the arm.

5. An apparatus as set forth in claim 1 wherein the power operated movable elements for effecting the turning movement of the mast, the vertical movement of the sleeve, the extensible and retractable movements of the linkage member and the pivotal movement of the bracket consists in each instance of a cylinder and a piston movable in the cylinder and having a rod which extends beyond the cylinder and is operatively connected to the part to be moved, and the power operated movable element for effecting the relative movement of the shear parts consists of a reversible hydraulic motor, and a source of power is carried by the mobile unit and consists of a tank for hydraulic fluid, a pump connected to the tank, and lines of piping including supply and return manifolds operatively connected to the several cylinders and the hydraulic motor.

6. An apparatus as set forth in claim 4 wherein the power operated movable elements for effecting the turning movement of the mast, the vertical movement of the sleeve, the extensible and retractable movements of the linkage member, the turning movement of the outer member of the arm, and the pivotal movement of the bracket consists in each instance of a cylinder and a piston movable in the cylinder and having a rod which extends beyond the cylinder and is operatively connected to the part to be moved, and the power operated movable element for effecting the relative movement of the shear parts consists of a reversible hydraulic motor, and a source of power is carried by the mobile unit and consists of a tank for hydraulic fluid, a pump connected to the tank, and lines of piping including supply and return manifolds operatively connected to the pump, the tank and the several cylinders and the hydraulic motor.

7. An apparatus as set forth in claim 3 wherein the element for effecting the turning movement of the shaft consists of a hydraulic motor.

8. An apparatus as set forth in claim 7 wherein the power operated movable elements for effecting the turning movement of the mast, the vertical movement of the sleeve, the extensible and retractable movements of the linkage members, the turning movement of the outer member of the arm and the pivotal movement of the bracket consists in each instance of a cylinder and a piston movable in the cylinder and having a rod which extends beyond the cylinder and is operatively connected to the part to be moved, the power operated movable element for effecting the relative movement of the shear parts consists of a reversible hydraulic motor, and the power operated element for effecting the movement of the shaft consists of a reversible hydraulic motor, and a source of power is carried by the mobile unit and consists of a tank for hydraulic fluid, a pump connected to the tank, and lines of piping including supply and return manifolds operatively connected to the several cylinders and the hydraulic motors.

9. An apparatus as set forth in claim 1 wherein the movable shear part of the cutter is mounted on a transverse shaft, a crown gear segment is carried by the shaft and has terminal stops at the ends of its teeth, a bevel gear engages the teeth of the segment and is mounted on a shaft, and a reversible hydraulic motor is provided for the operation of the shaft which carries the bevel gear.

10. An apparatus as set forth in claim 1 wherein each of the means responsive to the operations of its associated controlling element includes a plate valve having end ducts between its flat faces and an intermediate duct in one flat face, a casing in which the plate valve is slideably mounted, an operative connection between the plate valve and an associated controlling element whereby the controlling element effects the slideable movement of the plate valve, the plate valve as operated by its associated controlling element having three positions, including end positions in which either of its end ducts and its intermediate duct are in selectable communication with a corresponding power operated movable element and an intermediate position in which there is no communication of the end ducts with the corresponding power operated element, a line of tubing with which one of the end ducts communicates in one end position of the plate valve, a line of tubing with which the other end duct communicates in the other end position of the plate valve, the two lines of tubing alternately communicating with the power operated element and conveying hydraulic fluid to effect the movements of the element in opposite directions, each line of tubing communicating with the intermediate duct when the other line of tubing communicates with an end duct, a tank for hydraulic fluid, a pump for drawing hydraulic fluid from the tank, a supply manifold leading from the pump and conveying hydraulic fluid to the casing of the plate valve and a return manifold communicating with the intermediate duct at the time that either line of tubing is in communication with the intermediate duct.

References Cited by the Examiner

UNITED STATES PATENTS

| | | | |
|---|---|---|---|
| 2,565,252 | 8/51 | McFaull | 144—34 |
| 2,866,504 | 12/58 | Syers | 83—455 |
| 3,140,736 | 7/64 | Propst | 144—34 X |

ANDREW R. JUHASZ, *Primary Examiner.*